United States Patent [19]

Scheckenbach

[11] Patent Number: 6,133,357
[45] Date of Patent: Oct. 17, 2000

[54] MIXTURES OF THERMOSETS AND OXIDIZED POLYARYLENE SULFIDES

[75] Inventor: Helmut Scheckenbach, Langen, Germany

[73] Assignee: Ticona GmbH, Kelsterbach, Germany

[21] Appl. No.: 09/034,928

[22] Filed: Mar. 4, 1998

[30] Foreign Application Priority Data

Mar. 6, 1997 [DE] Germany ............... 197 09 035

[51] Int. Cl.$^7$ .............. C08L 61/34; C08L 63/00; C08L 67/00; C08L 81/06; C08L 83/04
[52] U.S. Cl. .............. 524/406; 524/500; 524/539; 524/541; 524/542; 525/7.4; 525/43; 525/101; 525/104; 525/121; 525/133; 525/144; 525/160; 525/166; 525/169; 525/474; 525/480; 525/509; 525/523; 525/539
[58] Field of Search .............. 525/537, 523, 525/7.4, 43, 474, 480, 509, 121, 133, 144, 160, 166, 169, 101, 104; 524/406, 500, 539, 541, 542

[56] References Cited

U.S. PATENT DOCUMENTS 5,231,150  7/1993  Mc Grail ............... 525/503

FOREIGN PATENT DOCUMENTS

| 1270589 | 6/1990 | Canada . |
| 0194232 | 9/1986 | European Pat. Off. . |
| 0275991 | 7/1988 | European Pat. Off. . |
| 0583224 | 2/1994 | European Pat. Off. . |
| 0633291 | 1/1995 | European Pat. Off. . |
| 0801109 | 10/1997 | European Pat. Off. . |

OTHER PUBLICATIONS

Derwent Abstracts No. XP–002078097 published Mar. 15, 1989.

*Primary Examiner*—Patricia A. Short
*Attorney, Agent, or Firm*—Frommer Lawrence & Haug LLP

[57] ABSTRACT

Polymer mixtures comprising at least one thermoset and at least one oxidized polyarylene sulfide have particularly good tribological behavior. Oxidized polyarylene sulfides used in these mixtures are polyarylene sulfones or oxidized polyarylene sulfides in which at least 10% of the sulfur bridges have been converted to sulfone bridges. Polyphenylene sulfone is employed with preference. The polymer mixtures are used to produce gearwheels, gear racks, bearings, chains, wheels or gasket materials.

9 Claims, No Drawings

MIXTURES OF THERMOSETS AND OXIDIZED POLYARYLENE SULFIDES

The invention relates to mixtures of thermosets and oxidized polyarylene sulfides, especially polyarylene sulfones or partially oxidized polyarylene sulfides which contain S, SO or $SO_2$ bridges, and to their use for producing shaped plastic parts.

Thermosets have been known for a relatively long time. They are distinguished by their ease of processing and by their good electrical properties. The broad spectrum of properties makes them an ideal material for numerous applications. A frequent disadvantage, however, is the tribological behavior of this group of materials.

For improving the tribological properties of thermosets use is made in particular of inorganic fillers such as quartz flour. This, however, is disadvantageous for the chemical resistance.

DE 4323181 A1 (=EP-A-0 633 290) and DE 4323121 A1 (=EP-A-0 633 291) describe mixtures of fluoropolymers and oxidized polyarylene sulfides, where the abrasion behavior of the fluoropolymers is improved through the addition of oxidized polyarylene sulfides. European Patent Application EP-A-0 801 109 describes mixtures of thermoplastics and oxidized polyarylene sulfides, where the abrasion behavior of the thermoplastics is improved through the addition of oxidized polyarylene sulfides.

The invention provides polymer mixtures comprising at least one thermoset (A) and at least one oxidized polyarylene sulfide (B). The proportion of the thermoset in the polymer mixture is in general from 10 to 99.9% by weight, preferably from 50 to 99% by weight and, in particular, from 80 to 99% by weight. The proportion of the oxidized polyarylene sulfide in the polymer mixture is in general from 0.1 to 90% by weight, preferably from 1 to 50% by weight and, in particular, from 1 to 20% by weight.

It has been found that the addition of oxidized polyarylene sulfides, especially polyarylene sulfones, to thermosets improves their tribological behavior. This is surprising since thermosets have physical and chemical properties which are entirely different from those of thermoplastics. For instance, thermoplastics are polymers which can be melted again following their processing step, while thermosets are infusible after their conversion to moldings.

By thermosets are meant polymers which consist of a curable resin/hardener mixture and which after curing can no longer be melted. They are well known and are described, for example, in Ullmann's Encyclopedia of Industrial Chemistry, VCH Verlagsgesellschaft mbH, Weinheim-New York, which is incorporated herein by way of reference. Examples are alkyd resins, Volume A1, pp. 409–424; phenolic resins, Volume A19, pp. 371–387; urea-formaldehyde and melamine-formaldehyde, Volume A2, pp. 115–142; unsaturated polyester resins, Volume A21, pp. 217–226; epoxy resins, Volume A9, pp. 547–563; curable silicone resins, Volume A24, pp. 57–94; thermosets, Volume A26, pp. 665–679. Thermosets are likewise described, for example, in Vieweg/Becker, Kunststoffhandbuch Volume X, Carl-Hanser Verlag, Munich, which is incorporated herein by reference.

Polyarylene sulfides and their preparation are described in Ullmann's Encyclopedia of Industrial Chemistry, Volume A21, B. Elvers, S. Hawkins and G. Schulz (eds.), VCH, Weinheim-New York 1992, pp. 463–472, which is incorporated herein by reference. The synthesis of polyarylene sulfides containing sulfone groups is described in Chimia 28(9), (1974) 567, which is likewise incorporated herein by reference.

Oxidized polyarylene sulfides are linear or branched polyarylene sulfides, some or all of whose sulfur groups have been converted to sulfoxide and/or sulfone groups. Oxidized polyarylene sulfides and their preparation are described in German Patent Applications DE 43 14 737 and DE 43 14 738, which are incorporated herein by reference. For the purposes of the invention, oxidized polyarylene sulfides are polyarylene sulfones, polyarylene sulfoxide sulfones, polyarylene sulfide sulfones and polyarylene sulfide sulfoxide sulfones, where in general at least 10%, preferably at least 30% and, with particular preference, at least 60% of the sulfur bridges have been converted to sulfone bridges. Particularly preferred oxidized polyarylene sulfides are oxidized polyphenylene sulfides.

Oxidized polyarylene sulfides are particularly stable to heat and chemicals and are highly stable under the conditions of thermoset processing. The oxidized polyarylene sulfides behave like fillers in the thermosets, i.e. they do not melt.

The mean particle size ($d_{50}$) of the oxidized polyarylene sulfides of the invention is in general in the range from 0.1 to 500 $\mu$m, preferably from 1 to 300 $\mu$m and, in particular, from 5 to 50 $\mu$m.

The mixtures of the invention are prepared by standard methods from the individual components in mixers suitable for this purpose and are then processed by known techniques (such as casting, thermoset injection molding, transfer molding).

The mixtures of the invention may include customary additives, such as heat stabilizers, UV stabilizers, antistats, flame retardants, dyes, pigments, inorganic and/or organic fillers, and also lubricant additives, such as molybdenum disulfide, graphite or polytetrafluoroethylene.

Additions of lubricant to the mixtures reduce the friction coefficient. The combination of low abrasion and low friction coefficient is often advantageous.

The mixtures are employed with advantage as materials in applications requiring low abrasion and low creep, such as sliding bearings or gasket materials, and as sheathing or packaging material for electronic components.

The mixtures are suitable for producing shaped plastic parts, such as gearwheels, gear racks, bearings, chains, rollers, wheels or gaskets.

EXAMPLES

Preparing polyphenylene sulfone ($PPSO_2$)

63 kg of polyphenylene sulfide powder ($d_{50}$: 20 $\mu$m) having a Tg of 94° C. and a Tm of 290° C. were introduced as initial charge in 219 l of glacial acetic acid at 50° C., 1.2 l of concentrated sulfuric acid were added, and 91 kg of hydrogen peroxide (50%) were added dropwise over 3 h during which the temperature rose to 60–65° C. After a period of subsequent stirring for 2 h at 65° C. and 1 h at 80° C., the reaction solution was cooled and filtered with suction at 50° C. and the solid product was washed with water and dried. Yield: 70 kg;

DSC data: Tg: 352° C., Tm: 520° C. (decomposition)

Elemental analysis: $(C_6H_4SO_2)_n$; C: 55.6%, H: 3.2%, S: 24.6%, O: 16.0%.

This corresponds to a degree of sulfur oxidation in the polymer of about 65%.

The constituents of the mixture—thermoset (A) consisting of resin and hardener, and polyphenylene sulfone (B)—were mixed at room temperature using a stirring apparatus and were then processed into 4 mm thick sheets under the conditions customary for thermosets. Test specimens were sawn from the cured sheets. The tribological properties of the test specimens were measured directly after their preparation.

The tribological data were determined on a pin-disk test unit. In this arrangement, a test pin is clamped into a mount at the lower end of a flexion bar. Mounted on the flexion bar are strain measurement strips for measuring the normal force and frictional force. The weights for generating the normal force are fastened to the top end of the flexion bar. The test pin is pressed vertically onto a rotating friction disk made of hardened steel (100 Cr 6, Rockwell hardness HRC>50). The surface roughness of the friction disk is measured prior to each test. The velocity of the disk is kept constant. The plastic pin, together with the bar, moves downwards as a result of wear to its abrading surface. The downward movement is measured by means of an inductive displacement sensor. The data are collated online and can be evaluated with a computer.

1. Mixtures of epoxy resins (EP) and $PPSO_2$

The epoxy resins used were Araldit CW 2215, a 60% mineral-filled EP resin, Araldit CY 219, an unfilled EP resin and Araldit HY 5161, an unfilled EP hardener. All Araldits are obtainable from Ciba-Geigy GmbH, Wehr/Baden, FR Germany.

The $PPSO_2$ used was the product specified under "Preparing polyphenylene sulfone ($PPSO_2$)". Its mean particle size was 20 µm.

The following mixtures were prepared, on which the following tribological data were measured:

| Mixture No. | Formulation | Wear coefficient* [$10^{-6}$ mm³/m] | Friction coefficient* [-] |
|---|---|---|---|
| A1 | 100 parts of Araldit CW 2215<br>20 parts of Araldit HY 5161 | 318 | 0.50 |
| A2 | 100 parts of Araldit CW 2215<br>4.4 parts of Araldit CY 219<br>22.2 parts of Araldit HY 5161<br>6.6 parts of $PPSO_2$ | 230 | 0.45 |
| A3 | 100 parts of Araldit CW 2215<br>10 parts of Araldit CY 219<br>25 parts of Araldit HY 5161<br>15 parts of $PPSO_2$ | 163 | 0.34 |
| A4 | 100 parts of Araldit CY 219<br>50 parts of Araldit HY 5161<br>20 parts of $PPSO_2$ | 130 | 0.44 |
| A5 | 100 parts of Araldit CY 219<br>50 parts of Araldit HY 5161<br>100 parts of $PPSO_2$ | 121 | 0.38 |

*Sliding velocity: 0.5 m/s, contact pressure: 1 N/mm², mean roughness depth: 0.7 µm 2. Mixtures of phenolic resins (PF) and $PPSO_2$ The PF used was Bakelit PF 1150, a filled PF resin from Bakelit GmbH, Iserlohn-Letmathe, FR Germany.

The $PPSO_2$ used was the product specified under "Preparing polyphenylene sulfone ($PPSO_2$)". Its mean particle size was 20 µm.

The following mixtures were prepared, on which the following tribological data were measured:

| Mixture No. | Formulation | Wear coefficient* [$10^{-6}$ mm³/m] |
|---|---|---|
| B1 | 100 parts of Bakelit PF 1150 | 240 |
| B2 | 100 parts of Bakelit PF 1150<br>5 parts of $PPSO_2$ | 130 |
| B3 | 100 parts of Bakelit PF 1150<br>10 parts of $PPSO_2$ | 110 |
| B4 | 100 parts of Bakelit PF 1150<br>20 parts of $PPSO_2$ | 105 |

*Sliding velocity: 0.5 m/s, contact pressure: 1 N/mm², mean roughness depth: 0.7 µm 3. Mixtures of melamine formaldehyde (MF) and $PPSO_2$ The MF used was Meloplas HT, a rockflour-filled resin from Ciba-Geigy Marienberg GmbH, Bensheim, FR Germany.

The $PPSO_2$ used was the product specified under "Preparing polyphenylene sulfone ($PPSO_2$)". Its mean particle size was 20 µm.

The following mixtures were prepared, on which the following tribological data were measured:

| Mixture No. | Formulation | Wear coefficient* [$10^{-6}$ mm³/m] |
|---|---|---|
| C1 | 100 parts of Meloplas HT | 315 |
| C2 | 100 parts of Meloplas HT<br>5 parts of $PPSO_2$ | 250 |
| C3 | 100 parts of Meloplas HT<br>10 parts of $PPSO_2$ | 195 |
| C4 | 100 parts of Meloplas HT<br>20 parts of $PPSO_2$ | 180 |

*Sliding velocity: 0.5 m/s, contact pressure: 1 N/mm², mean roughness depth: 0.7 µm 4. Mixtures of unsaturated polyester resin (UP) and $PPSO_2$ The UP used was Ampal PM 350, a cellulose- and rockflour-filled UP resin from Ciba-Geigy Marienberg GmbH, Bensheim, FR Germany.

The $PPSO_2$ used was the product specified under "Preparing polyphenylene sulfone ($PPSO_2$)". Its mean particle size was 20 µm.

The following mixtures were prepared, on which the following tribological data were measured:

| Mixture No. | Formulation | Wear coefficient* [$10^{-6}$ mm³/m] |
|---|---|---|
| D1 | 100 parts of Ampal PM 350 | 234 |
| D2 | 100 parts of Ampal PM 350<br>5 parts of $PPSO_2$ | 184 |
| D3 | 100 parts of Ampal PM 350<br>10 parts of $PPSO_2$ | 155 |
| D4 | 100 parts of Ampal PM 350<br>20 parts of $PPSO_2$ | 132 |

*Sliding velocity: 0.5 m/s, contact pressure: 1 N/mm², mean roughness depth: 0.7 µm

What is claimed is:

1. A polymeric mixture consisting essentially of at least one thermoset and at least one not melting oxidized or partially oxidized polyarylene sulfide, at least 60% of the sulfur bridges having been converted to sulfone bridges.

2. The polymer mixture as claimed in claim 1, wherein the thermoset is prepared using alkyd resins, phenolic resins, unsaturated polyester resins, epoxy resins, curable silicone resins, urea-formaldehyde or melamine-formaldehyde.

3. The polymer mixture as claimed in claim 1, wherein at least one oxidized or partially oxidized polyarylene sulfide is oxidized or partially oxidized polyphenylene sulfide or a polyphenylene sulfone, at least 60% of the sulfur bridges having been converted to sulfone bridges.

4. The polymer mixture as claimed in claim 1, wherein from 0.1 to 90% by weight of oxidized polyarylene sulfide is present.

5. The polymer mixture as claimed in claim 1, wherein from 1 to 50% by weight of oxidized polyarylene sulfide is present.

6. A method of using the polymer mixture as claimed in claim 1 for producing shaped plastic parts, which comprises, mixing said at least one thermoset and said at least one not melting oxidized or partially oxidized polyarylene sulfide, at least 60% of the sulfur bridges having been converted to sulfone bridges optionally with the addition of stabilizers, antistats, flame retardants, dyes, pigments, fillers or lubricants, in a mixer to give a polymer mixture and producing moldings from said polymer mixture by casting, transfer molding or thermoset injection molding.

7. The method of using the polymer mixture as claimed in claim 6 for producing a shaped plastic part selected from the group consisting of gearwheels, gear racks, bearings, chains, rollers, wheels or gasket materials.

8. A polymeric mixture consisting essentially of at least one thermoset and at least one not melting oxidized polyarylene sulfide, at least 60% of the sulfur bridges having been converted to sulfone bridges, heat stabilizers, UV stabilizers, antistats, flame retardants, dyes, pigments, inorganic or organic fillers.

9. A polymeric mixture consisting essentially of at least one thermoset and at least one not melting oxidized polyarylene sulfide, at least 60% of the sulfur bridges having been converted to sulfone bridges, a lubricant selected from the group consisting of molybdenum disulfide, graphite or polytetrafluoroethylene.

* * * * *